(12) United States Patent
Muroyama et al.

(10) Patent No.: US 8,613,231 B2
(45) Date of Patent: Dec. 24, 2013

(54) SHEET-LIKE TACTILE SENSOR SYSTEM

(75) Inventors: Masanori Muroyama, Sendai (JP); Masayoshi Esashi, Sendai (JP); Shuji Tanaka, Sendai (JP); Sakae Matsuzaki, Sendai (JP); Mitsutoshi Makihata, Sendai (JP); Yutaka Nonomura, Nagoya (JP); Motohiro Fujiyoshi, Seto (JP); Takahiro Nakayama, Nagoya (JP); Hitoshi Yamada, Aichi-gun (JP); Ui Yamaguchi, Toyota (JP)

(73) Assignees: Tohoku University, Sendai-Shi (JP); Kabushiki Kaisha Toyota Chuo Kenkyusho, Aichi-Gun (JP); Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/502,082

(22) PCT Filed: Oct. 14, 2009

(86) PCT No.: PCT/JP2009/005362
§ 371 (c)(1),
(2), (4) Date: Jun. 20, 2012

(87) PCT Pub. No.: WO2011/045837
PCT Pub. Date: Apr. 21, 2011

(65) Prior Publication Data
US 2012/0247226 A1    Oct. 4, 2012

(51) Int. Cl.
*G01D 7/00*    (2006.01)
*G01L 3/00*    (2006.01)
*G01L 3/22*    (2006.01)

(52) U.S. Cl.
USPC ...................... 73/862.046; 73/862

(58) Field of Classification Search
USPC .............................................. 73/862, 862.046
See application file for complete search history.

(56) References Cited

U.S. PATENT DOCUMENTS

| | | | |
|---|---|---|---|
| 2011/0083517 A1* | 4/2011 | Muroyama et al. | 73/862.046 |
| 2012/0199921 A1* | 8/2012 | Tanaka et al. | 257/415 |

FOREIGN PATENT DOCUMENTS

| | | |
|---|---|---|
| JP | 60-034295 A | 2/1985 |
| JP | 06-167400 A | 6/1994 |

(Continued)

OTHER PUBLICATIONS

International Search Report mailed Jan. 12, 2010 of PCT/JP2009/005362.

*Primary Examiner* — Lisa Caputo
*Assistant Examiner* — Jamel Williams
(74) *Attorney, Agent, or Firm* — Kenyon & Kenyon LLP

(57) ABSTRACT

Provided are multiple normal stress detection sensor units capable of detecting a normal stress, and a sheet layer portion. The sheet layer portion includes an exterior sheet layer portion, a force detection sheet layer portion incorporating normal stress detection units, and an intermediary layer sandwiched between the exterior sheet layer portion and the force detection sheet layer portion. The exterior sheet layer portion and the force detection sheet layer portion include multiple protrusions protruding in directions opposed to each other, and are disposed such that the protrusions engage each other with the intermediary layer interposed therebetween. Each normal stress detection sensor unit includes a central portion detection sensor device disposed immediately below a central portion of the protrusion provided on the force detection sheet portion, and at least two edge detection sensor devices disposed immediately below edge portions of the protrusion provided on the force detection sheet portion.

15 Claims, 18 Drawing Sheets

(56) References Cited

FOREIGN PATENT DOCUMENTS

| | | | |
|---|---|---|---|
| JP | 2001-330526 A | | 11/2001 |
| JP | 2001329418 A | * | 11/2001 |
| JP | 2002236543 A | * | 8/2002 |
| JP | 2004-117042 A | | 4/2004 |
| JP | 2006-208248 A | | 8/2006 |
| JP | 2008-281403 A | | 11/2008 |
| JP | 2009-002740 A | | 1/2009 |
| WO | 2011/045835 A1 | | 4/2011 |
| WO | 2011/045929 A1 | | 4/2011 |

* cited by examiner

SHEET-LIKE TACTILE SENSOR SYSTEM

This is a 371 national phase application of PCT/JP2009/005362 filed 14 Oct. 2009, the contents of which are incorporated herein by reference.

TECHNICAL FIELD

The present invention relates to a sheet-like tactile sensor system which is mounted on a surface portion (for example, a hand portion or an entire body surface) of a robot, for example, and which detects a contact with an object.

BACKGROUND ART

The development of humanoid robots has been in progress.

Such humanoid robots are expected to perform sophisticated actions such as touching with a human, autonomously avoiding an obstacle, and grasping and transporting an object.

Since sensing of touch is necessary for such actions, a technique for providing a tactile sensor on a hand portion of a robot or the entire body surface of a robot has been studied in recent years (for example, Patent Literatures 1 and 2).

Examples of the actions expected to be performed by a robot include an action of grasping an object.

FIG. 18 is a diagram showing a state where a robot 10 lifts an object 13 with a hand portion 12.

Referring to FIG. 18, the hand portion 12 of the robot 10 is provided with a tactile sensor unit 14 that detects a contact with the object 13.

The robot 10 grasps and lifts the object 13 with an appropriate force by a feedback control based on a contact force detected by the tactile sensor unit 14.

Forces acting between the hand portion 12 of the robot 10 and the object 13 include a normal stress acting perpendicularly to a gripping surface of the hand portion 12 of the robot 10, and a shearing force (a shearing stress, a tangential stress) acting in the tangential direction along the surface of the hand portion 12 of the robot 10.

In the case of detecting a normal stress, an existing force detection sensor for detecting a perpendicularly acting force may be used.

On the other hand, it is not always easy to detect a shearing force.

In this regard, Patent Literature 1 discloses the sensor unit 14 that detects a shearing force from an object as shown in FIG. 19.

The sensor unit 14 disclosed in Patent Literature 1 has a configuration as described below.

The sensor unit 14 includes a deformable member 31 which is to be deformed by a shearing force received from an object, and a strain sensor 32 buried in the deformable member 31.

The strain sensor 32 includes flat plates 32a standing perpendicularly as cantilevers, and strain gauges 32b attached to the respective flat plates 32a.

When a shearing force (a tangential stress) acts on the surface of the deformable member 31, the deformable member 31 strains.

Along with this strain, the cantilevers 32a also strain.

The strain gauges 32b detect the amount of deformation of the cantilevers 32a at this time, thereby detecting the shearing force acting on the surface of the deformable member 31.

As shown in FIG. 20, Patent Literature 2 discloses a tactile sensor device 20 having a configuration in which cantilevers 41, each of which stands erect from a base 16 through a hinge, are buried in an elastic body 42 made of silicon.

Indeed, the configuration in which the cantilevers standing erect are buried in the deformable member as disclosed in Patent Literatures 1 and 2 enables detection of a shearing force acting on the deformable member.

CITATION LIST

Patent Literature

[Patent Literature 1] Japanese Unexamined Patent Application Publication No. 2008-281403
[Patent Literature 2] Japanese Unexamined Patent Application Publication No. 2006-208248

SUMMARY OF INVENTION

Technical Problem

However, the cantilevers 41 as disclosed in Patent Literature 2, for example, have such a drawback that if the electrostatic attraction exceeds the restoring force, a failure occurs in which a cantilever electrode serving as a sensing portion adheres due to pull-in.

Such a failure due to pull-in is liable to occur during manufacturing and mounting.

In the configuration as disclosed in Patent Literature 1, the flat plates 32a serving as cantilevers need to stand erect while facing a predetermined direction in the deformable member 31.

Achieving this is expected to be quite difficult during manufacturing.

If the cantilevers 32a are laid down or fail to face the predetermined direction during manufacturing, the detection resolution and detection accuracy extremely deteriorate. This makes it difficult to maintain the product quality.

Assuming that a tactile sensor unit is mounted on the surface of the robot 10, the surface of the robot 10 is curved or uneven.

If a cantilever-type sensor unit is mounted on such a surface, the cantilever electrode curves along with a deformation of the deformable member.

Accordingly, the cantilevers are laid down during mounting, for example, and thus it is difficult to mount the sensor unit on the surface of the robot while maintaining an appropriate state.

The configurations of sensor devices of related art as disclosed in Patent Literatures 1 and 2 are not suitable as a tactile sensor system to be mounted on a hand portion or an entire body surface of a robot, and are not practical.

Solution to Problem

An exemplary aspect of the present invention is a sheet-like tactile sensor system that detects a normal stress and a shearing force when the sheet-like tactile sensor system contacts an object, the sheet-like tactile sensor system including:
a plurality of normal stress detection sensor units capable of detecting a normal stress;
a sheet layer portion formed of three sheet layers laminated, the sheet layer portion being configured to be deformed by a contact with the object and to transmit the contact force to the normal stress detection unit, in which
the sheet layer portion includes:
an exterior sheet layer portion forming an outer surface;
a force detection sheet layer portion incorporating the normal stress detection unit or being disposed immediately above the normal stress detection unit; and an intermediary layer sandwiched between the exterior sheet layer portion and the force detection sheet layer portion and transmitting an acting force from the exterior sheet layer portion to the force detection sheet layer portion, the exterior sheet layer portion and the force detection sheet layer portion have a plurality of protrusions protruding in directions opposed to each other, and are disposed such that the protrusions of the exterior sheet layer portion and the protrusions of the force detection sheet layer portion engage each other with the intermediary layer interposed therebetween, and each of the normal stress detection sensor units includes:
a central portion detection sensor element disposed immediately below a central portion of each of the protrusions provided on the force detection sheet portion; and
at least two edge detection sensor elements disposed immediately below edge portions of each of the protrusions provided on the force detection sheet portion so as to sandwich the central portion detection sensor element.

DESCRIPTION OF EMBODIMENTS

Figure 1:
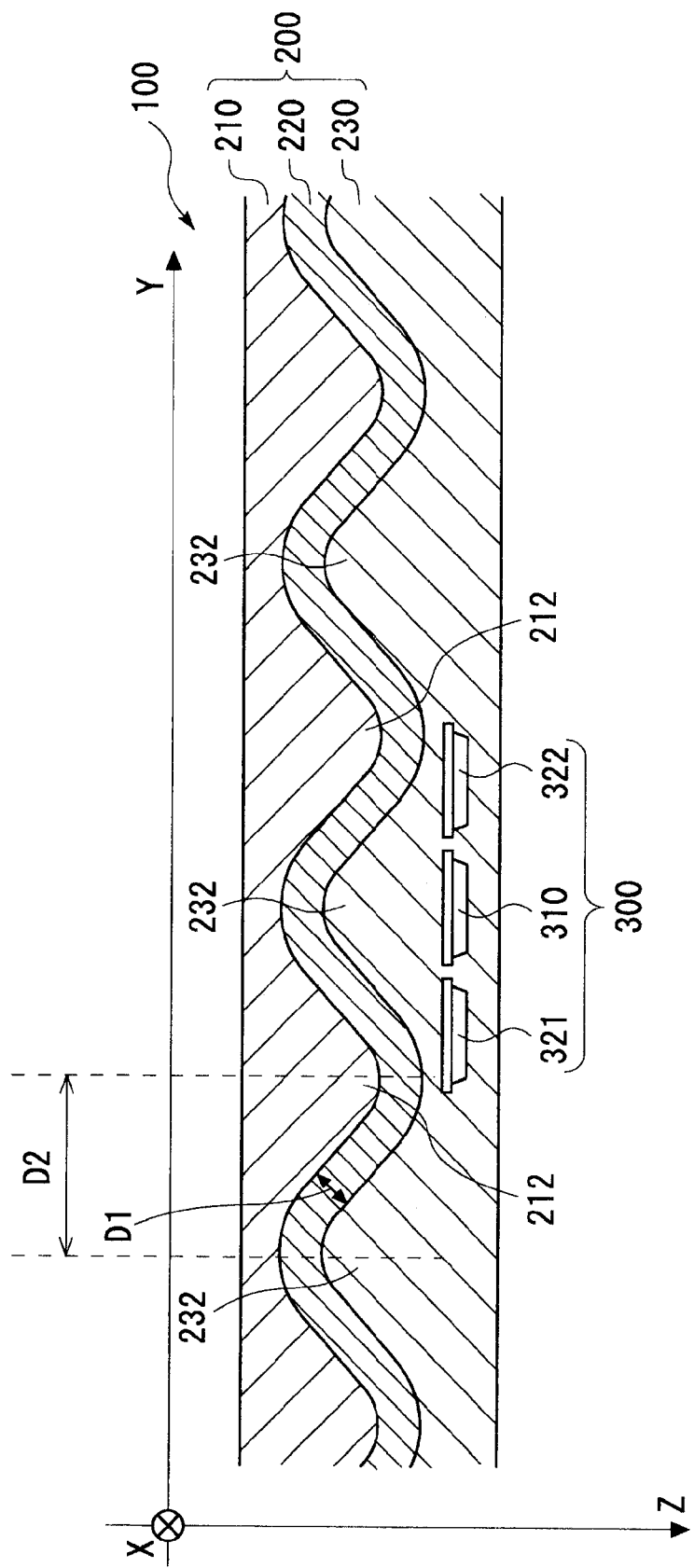
FIG. 1 is diagram showing a sectional view of a contact sensor system.

Exemplary embodiments of the present invention will be described with reference to reference numerals assigned to the elements in the drawings.

First Exemplary Embodiment

A sheet-like tactile sensor system 100 according to a first exemplary embodiment of the present invention will be described.

FIG. 1 is a diagram showing a sectional view of the sheet-like tactile sensor system.

Figure 2:
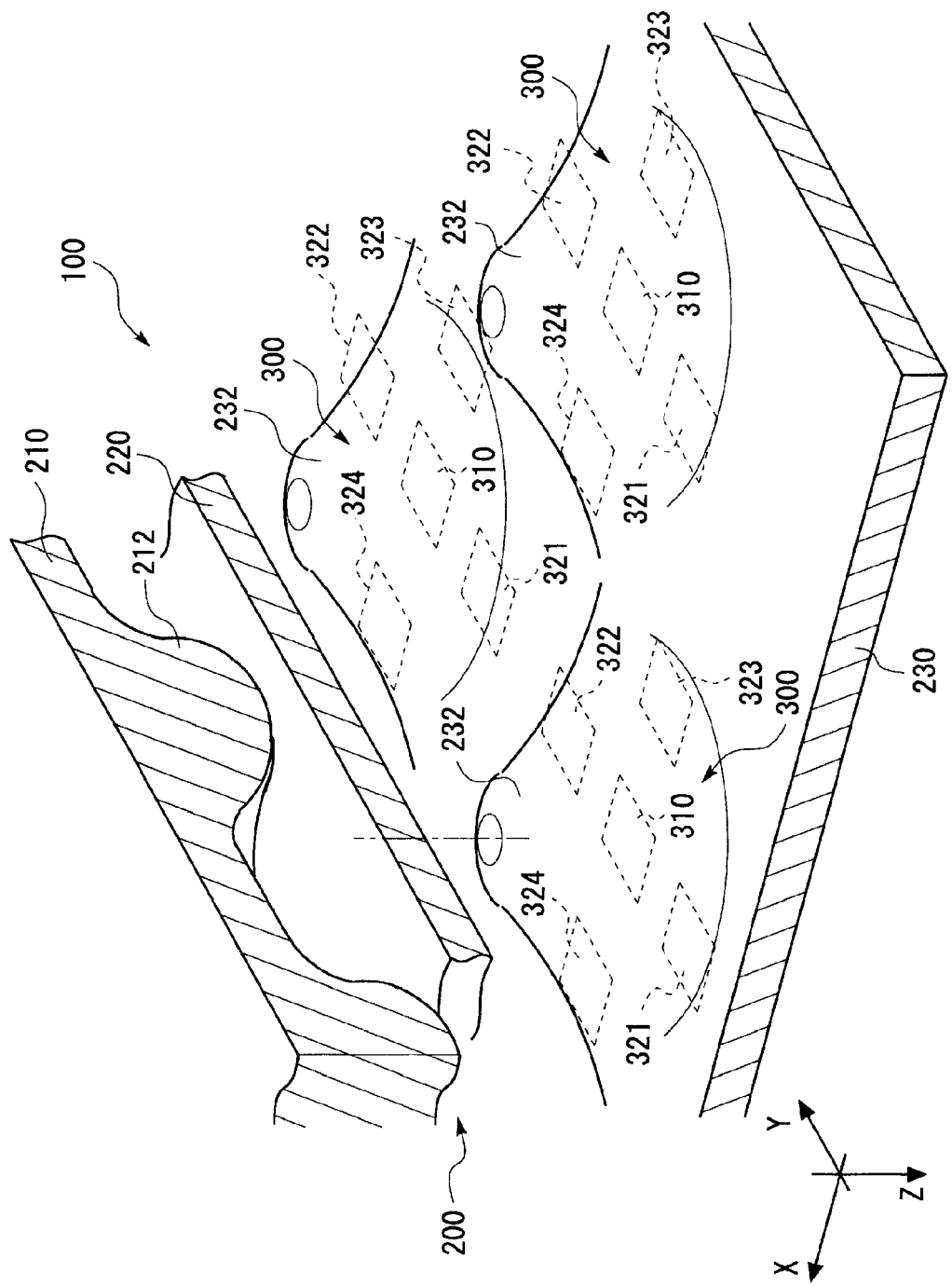
FIG. 2 is a diagram showing a state where an outer layer forming a sheet layer portion, an intermediate layer, and an inner layer are separate from each other.

FIG. 2 is an exploded perspective view showing a state where an exterior sheet layer portion, an intermediary layer portion, and a force detection sheet layer portion are separate from each other.

Figure 3:
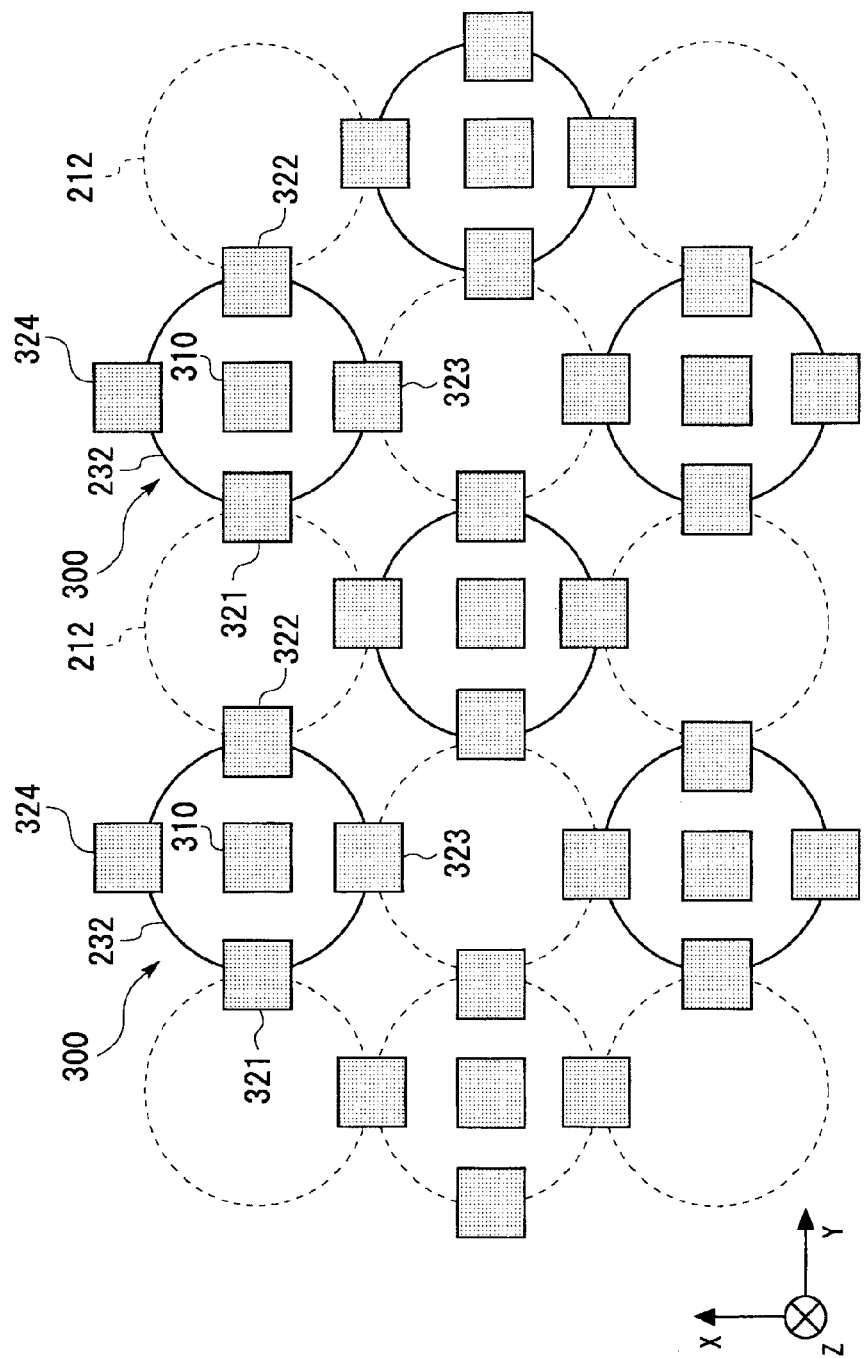
FIG. 3 is a perspective view of a sheet-like tactile sensor system when viewed from the top.

FIG. 3 is a perspective view of the sheet-like tactile sensor system when viewed from the top.

The present invention provides a tactile sensor system that detects a force acting when an object contacts the outer surface of a sheet layer portion.

The sheet-like contact sensor system 100 includes a sheet layer portion 200 and normal stress detection sensor units 300 that detect a force acting on the outer surface of the sheet layer portion 200.

The sheet layer portion 200 has a three-layer structure.

The sheet layer portion 200 includes an exterior sheet layer portion 210, an intermediary layer portion 220, and a force detection sheet layer portion 230.

The intermediary layer portion 220 has flexibility and is sandwiched between the exterior sheet layer portion 210 and the force detection sheet layer portion 230.

In this case, the intermediary layer portion 220 is formed of an elastic body, a viscous body, or a viscoelastic body.

The intermediary layer portion 220 is more flexible than the exterior sheet layer portion 210 and the force detection sheet layer portion 230.

That is, when the intermediary layer portion 220 is formed of an elastic body, the intermediary layer portion 220 has an elastic modulus smaller than that of the exterior sheet layer portion 210 and the force detection sheet layer portion 230.

The intermediary layer portion 220 may be formed of a viscous fluid such as sol, or a viscoelastic body such as gel.

The intermediary layer portion 220 is formed of a resin material such as silicone resin or elastomer, for example.

Next, the exterior sheet layer portion 210 and the force detection sheet layer portion 230 will be described.

For convenience of explanation, assume herein that the downward direction in FIG. 1 corresponds to a Z-axis; the horizontal direction in FIG. 1 corresponds to a Y-axis.

The upward direction in FIG. 3 corresponds to an X-axis.

The exterior sheet layer portion 210 is a sheet disposed at the outermost side of the tactile sensor system 100.

The exterior sheet layer portion 210 is formed of an elastic body having such an elasticity that allows the exterior sheet layer portion to be gently deformed when an object contacts the outer surface. The exterior sheet layer portion 210 is formed of silicon rubber, for example.

The outer surface of the exterior sheet layer portion 210 is a smooth surface with no unevenness.

The inner surface of the exterior sheet layer portion 210 is provided with protrusions 212 having an inward (−Z-direction in FIG. 1) convex shape.

The protrusions provided on the exterior sheet layer portion 210 are referred to as the outer protrusions 212.

The plurality of outer protrusions 212 are provided at regular intervals in each of the Y-direction and the X-direction.

Each of the outer protrusions 212 has a substantially conical shape.

However, the shape of each of the outer protrusions 212 may be changed, for example, by rounding the vertex of each of the protrusions 212 or by cutting off the top thereof to form a truncated cone shape.

The inner surface of the force detection sheet layer portion 230 is provided with protrusions 232 having an inward (+Z-direction in FIG. 1) convex shape.

The protrusions provided on the force detection sheet layer portion 230 are referred to as the force detection protrusions 232.

Each of the force detection protrusions 232 has a shape similar to that of the outer protrusions 212. The plurality of force detection protrusions 232 are provided at regular intervals in each of the Y-direction and the X-direction.

The outer protrusions 212 and the force detection protrusions 232 are provided to engage with each other with the intermediary layer portion 220 interposed therebetween when the exterior sheet layer portion 210 and the force detection sheet layer portion 230 are disposed to be opposed to each other.

That is, at least inclined planes of the outer protrusions 212 and the force detection protrusions 232 are opposed to each other with the intermediary layer portion 220 interposed therebetween.

It is not preferable that the outer protrusions 212 and the force detection protrusions 232 engage with each other too much or too roughly.

A distance D1 between the outer protrusions 212 and the force detection protrusions 232 is adjusted to such a degree that the displacement or deformation of the exterior sheet layer portion 210 is transmitted to the deformation of the force detection protrusions 232 from the outer protrusions 212 through the intermediary layer portion 220.

As the thickness of the intermediary layer portion 220 is increased, the sensor resolution is decreased, but the impact resistance is improved.

A distance D2 between the top of each of the outer protrusions 212 and the top of each of the force detection protrusions 232 is equal to or about five times greater than the thickness of the intermediary layer portion 220, for example. As the distance D2 is reduced, the sensor sensitivity can be increased.

The normal stress detection sensor units 300 are buried in the force detection sheet layer portion 230.

In this case, the normal stress detection sensor units 300 are disposed immediately below the force detection protrusions 232.

Each of the normal stress detection sensor units 300 includes a central portion detection sensor device 310 and four edge detection sensor devices 321, 322, 323, and 324.

The central portion detection sensor device 310 is disposed immediately below the central portion of each of the force detection protrusions 232.

The edge detection sensor devices 321, 322, 323, and 324 are disposed immediately below the edges of each of the force detection protrusions 232.

The edge detection sensor devices 321, 322, 323, and 324 are disposed in each of the Y-direction and the X-direction.

Assume herein that each edge detection sensor device disposed in the −Y-direction is referred to as the −Y edge detection sensor device 321 and each edge detection sensor device disposed in the +Y-direction is referred to as the +Y edge detection sensor device 322, with the central portion detection sensor device 310 interposed therebetween.

Similarly, assume that each edge detection sensor device disposed in the −X-direction is referred to as the −X edge detection sensor device 323 and each edge detection sensor device disposed in the +X-direction is referred to as the +X edge detection sensor device 324, with the central portion detection sensor device 310 interposed therebetween.

The central portion detection sensor device 310 and the edge detection sensor devices 321, 322, 323, and 324 have the same configuration except that they are disposed at different positions.

Now, a configuration of a detection sensor device 400 will be described.

For convenience of explanation, the elements of the detection sensor device are denoted by reference numerals in the 400s. However, the detection sensor device 400 has the same configuration as that of the central portion detection sensor device 310 and the edge detection sensor devices 321, 322, 323, and 324.

Figure 4:
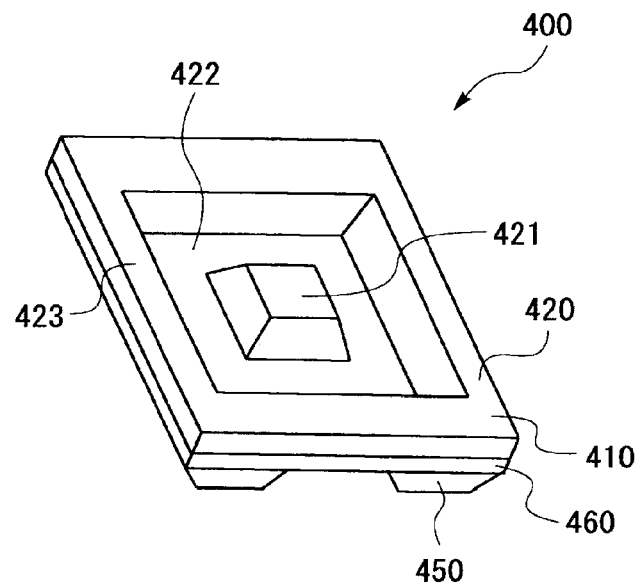
FIG. 4 is a perspective view of a detection sensor device when viewed from the front surface side.

FIG. 4 is a perspective view of the detection sensor device 400 when viewed from the front surface side.

Figure 5:
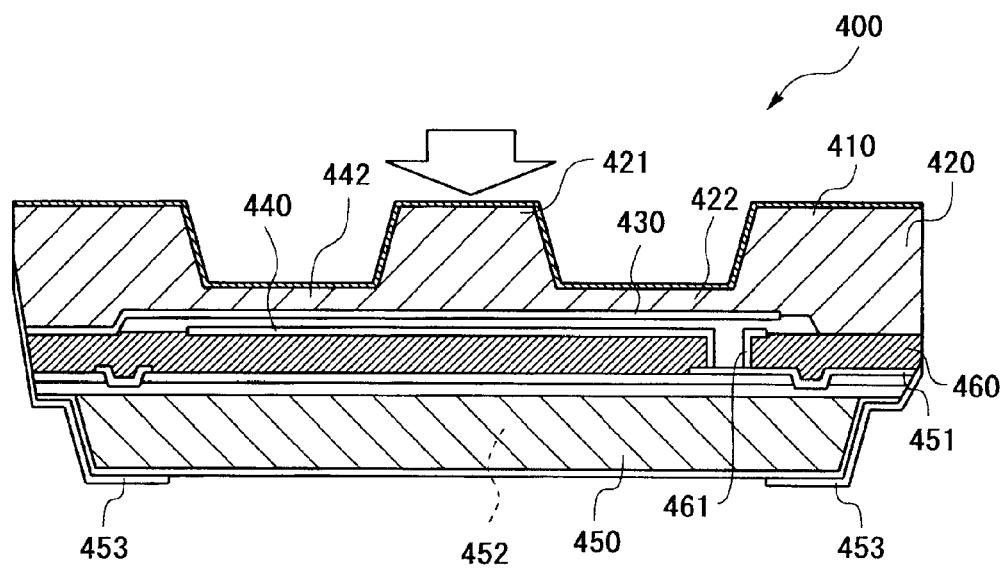
FIG. 5 is a sectional view of the detection sensor device.

FIG. 5 is a sectional view of the detection sensor device 400.

As shown in FIG. 5, the detection sensor device 400 has a configuration in which a sensor structure portion 410 and a semiconductor substrate 450 are bonded together with an adhesion layer 460.

The sensor structure portion 410 includes a main structure body 420, a first sensor electrode 430, and a second sensor electrode 440.

The main structure body 420 is formed of Si.

A force detection portion 421 having a convex shape to be in contact with an object is provided at the center of the main structure body 420 when view from the front side, and a thin portion 22 having a concave shape is formed around the force detection portion 421.

Because the thin portion 422 has elasticity, the main structure body 420 serves as an actuating film.

Specifically, when a force is applied to the force detection portion 421, the main structure body 420 warps.

Here, the force detection portion 421 forms a contact sensing surface.

A peripheral edge portion at the periphery of the thin portion 422 serves as a support frame portion 423 that supports the actuating film.

Further, a recess 424 is formed in the back surface of the main structure body 420.

The first sensor electrode 430 is provided in the recess 424 formed in the back surface of the main structure body 420.

The first sensor electrode 430 is a movable electrode which is displaced with the actuating film.

The second sensor electrode 440 is provided immediately above the adhesion layer 460.

The distance between the first sensor electrode 430 and the second sensor electrode 440 is defined depending on the depth of the recess 424.

The second sensor electrode 440 is a fixed electrode. The first sensor electrode 430 and the second sensor electrode 440, which are disposed to be opposed to each other, form a capacitive element.

The second sensor electrode 440 is connected to a redistribution layer 451 of the semiconductor substrate 450 through a via hole 461 formed in the adhesion layer 460.

The first and second sensor electrodes 430 and 440 are sealed in the sensor device 400.

An integrated circuit 452 for signal processing is fabricated in the semiconductor substrate 450.

The integrated circuit 452 performs signal processing on sensor signals supplied from the sensor structure portion 410, and outputs data signals from external terminals 453 led out to the back surface of the semiconductor substrate.

In the case where the sheet-like tactile sensor system 100 is actually mounted on the robot 10, the back surface of the force detection sheet layer portion 230 may be attached to the body surface of the robot 10.

Figure 6:
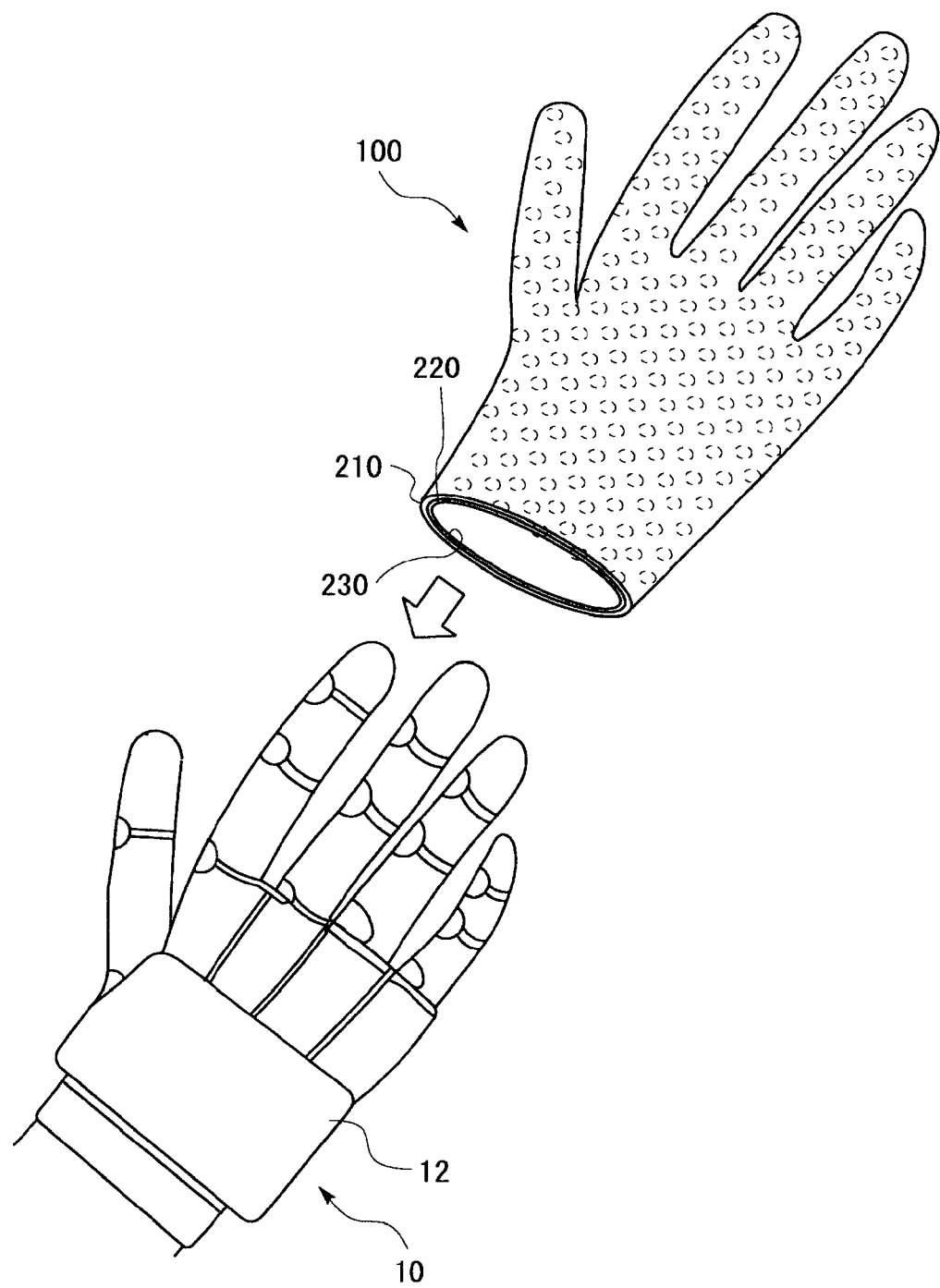
FIG. 6 is a view illustrating a case where the sheet-like tactile sensor system is formed in a bag shape.

Alternatively, as shown in FIG. 6, the sheet-like tactile sensor system 100 may be formed in a bag shape to cover the hand portion 12 of the robot 10.

Operations of the first exemplary embodiment will be described with reference to FIGS. 7, 8, and 9.

Figure 7:
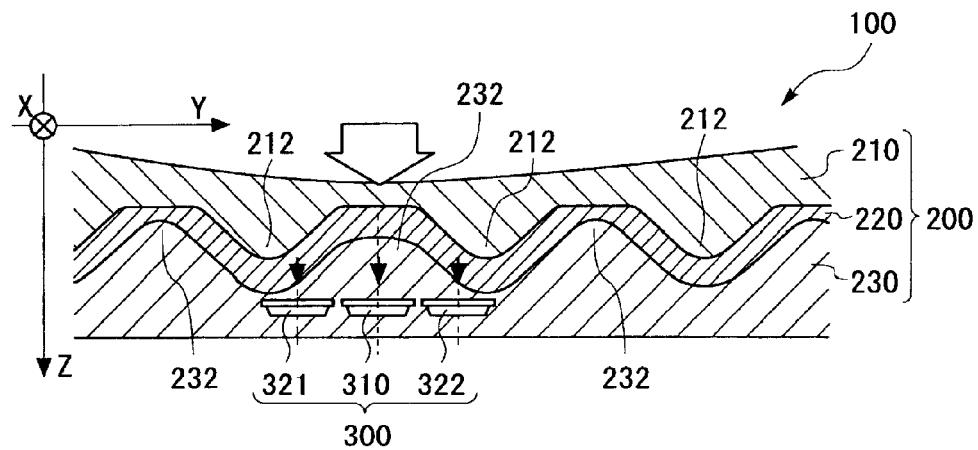
FIG. 7 is a diagram showing a case where a normal stress is applied to the outer surface of the sheet-like tactile sensor system.

FIG. 7 shows a case where a normal stress is applied to the outer surface of the sheet-like tactile sensor system 100.

As shown in FIG. 7, when a normal stress acts perpendicularly to the outer surface, the exterior sheet layer 210 is depressed.

The deformation of the exterior sheet layer 210 is transmitted to the force detection sheet layer portion 230 through the intermediary layer portion 220, with the result that the force detection sheet layer portion 230 is deformed to be depressed.

When the force detection sheet layer portion 230 is depressed, a normal stress is applied to the normal stress detection sensor unit 300 buried in the force detection sheet layer portion 230.

In this case, the normal stress acts substantially evenly on the portion immediately below the central portion of each of the force detection protrusions 232 and on the edges of each of the force detection protrusions 232.

Accordingly, in a single normal stress detection sensor unit 300, the central portion detection sensor device 310 and the edge detection sensor devices 321, 322, 323, and 324 detect substantially the same force.

Thus, when the central portion detection sensor device 310 and the edge detection sensor devices 321, 322, 323, and 324 detect substantially the same force, the normal stress applied to the outer surface can be detected.

Figure 8:
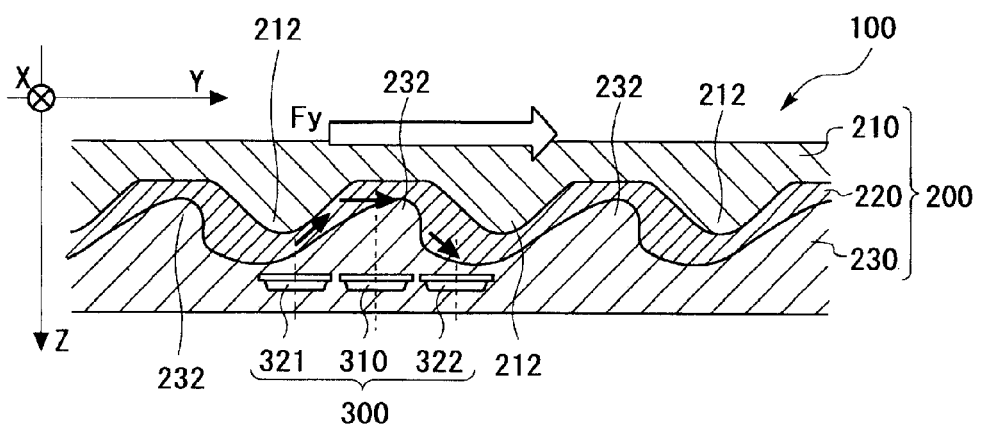
FIG. 8 is a diagram showing a case where a shearing force is applied to the outer surface of the sheet-like tactile sensor system.

FIG. 8 shows a case where a shearing force (a tangential stress, a shearing stress) acts on the outer surface.

Assume herein that a shearing force in the +Y-axis direction is applied.

In this case, the outer surface is pulled in the +Y-direction, with the result that the exterior sheet layer portion 210 is displaced in the +Y-direction.

At this time, the outer protrusions 212 are also displaced in the +Y-direction together with the exterior sheet layer portion 210.

Then, the intermediary layer portion 220 is also displaced in the +Y-direction by being pushed by the outer protrusions 212.

Due to the displacement of the intermediary layer portion 220, the force detection protrusions 232 are pushed in the +Y-direction.

At this time, since each of the outer protrusions 212 has a tapered shape, the proximal portion of each protrusion strongly pushes the intermediary layer portion 220 due to its high rigidity.

On the other hand, the tip portion of each of the outer protrusions 212 has a small rigidity, and thus the force for pushing the intermediary layer portion 220 is small.

Further, since each of the force detection protrusions 232 has a tapered shape, tip ends of the force detection protrusions 232 are more liable to be deformed when receiving the force.

Accordingly, the force detection protrusions 232 are deformed such that the tip ends thereof are displaced to a larger degree in the +Y-direction.

When the force detection protrusions 232 are deformed such that the tip ends thereof are displaced to a larger degree in the +Y-direction, a force for raising the edges of the force detection protrusions 232 acts in the −Y-direction of the force detection protrusions 232 as shown in FIG. 8.

Additionally, a force for depressing the edges of the force detection protrusions 232 acts in the +Y-direction of the force detection protrusions 232.

Accordingly, the −Y edge detection sensor device 321 detects the raising force. In this case, the detected force is negative.

Further, the +Y edge detection sensor device 322 detects the force in the depressing direction. In this case, the detected force is positive.

Thus, when the opposite forces are detected in the −Y edge detection sensor device 321 and the +Y edge detection sensor device 322, a shearing force (a tangential stress, a shearing stress) applied to the outer surface can be detected.

Additionally, the direction of the shearing force can also be detected based on the relation between positive and negative of detected values.

Figure 9:
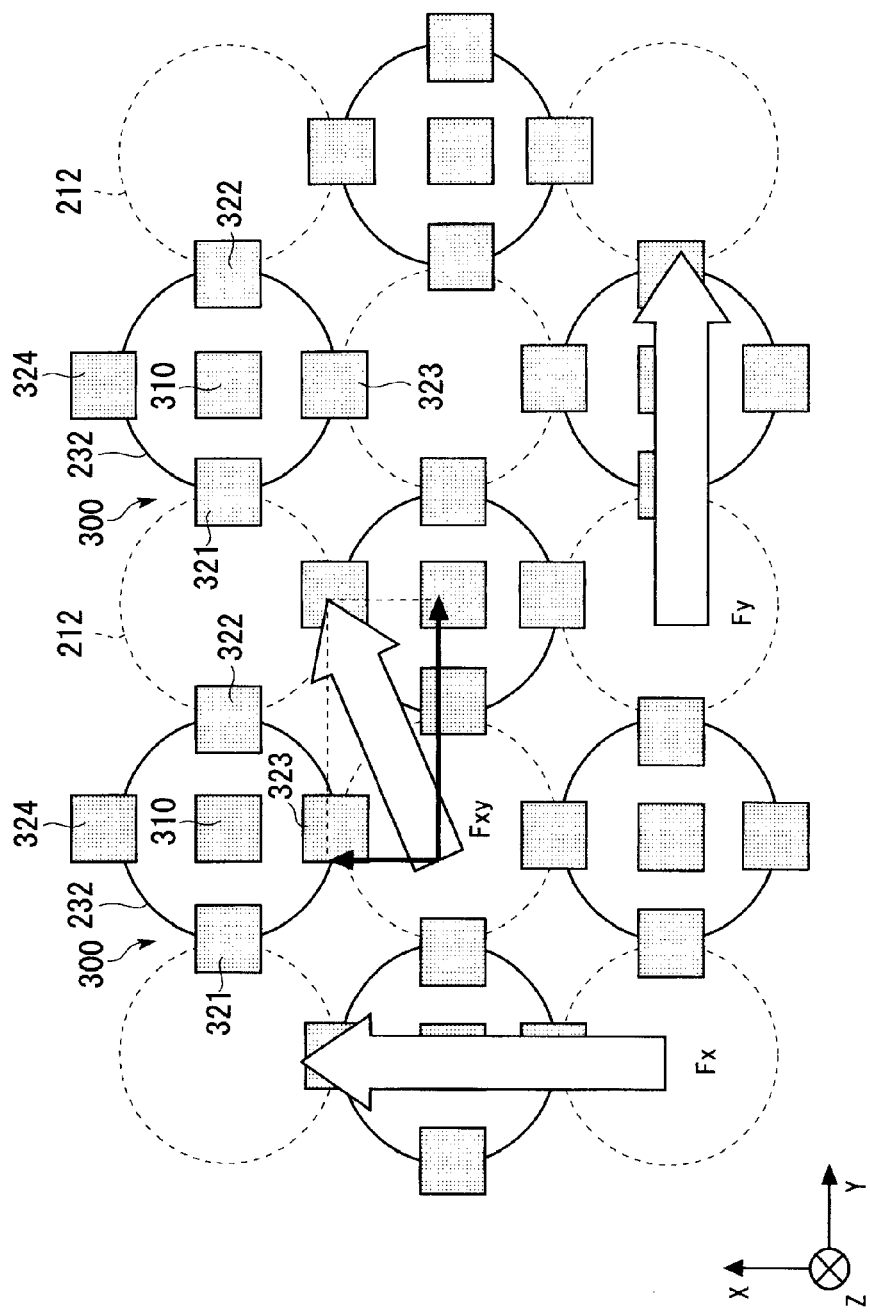
FIG. 9 is a diagram showing a state where shearing forces in an X-direction, a Y-direction, and an oblique direction are detected by the sheet-like tactile sensor system.

Note that as shown in FIG. 9, the edge detection sensor devices 321 and 322 are disposed in the −Y-direction (321) and the +Y-direction (322), respectively, with the central portion detection sensor device 310 interposed therebetween, thereby enabling detection of a shearing force in the Y-direction.

The edge detection sensor devices 323 and 324 are disposed in the −X-direction (323) and the +X-direction (324), respectively, with the central portion detection sensor device 310 interposed therebetween, thereby enabling detection of a shearing force in the X-direction.

A diagonal shearing force with an angle with respect to the X-axis and the Y-axis can be decomposed into forces in the Y-direction and the X-direction. Accordingly, the diagonal force can also be detected by combining the sensor values of the sensor devices 321 and 322 in the Y-direction array with the sensor values of the sensors 323 and 324 in the X-direction array.

According to the first exemplary embodiment having the configuration as described above, the following effects can be obtained.

(1) In the first exemplary embodiment, the central portion detection sensor device 310 and the edge detection sensor devices 321, 322, 323, and 324 are disposed immediately below each of the force detection protrusions 232, thereby enabling detection of a force applied to the outer surface.

In particular, a shearing force applied to the outer surface can also be detected by differential detection using two edge detection sensor devices disposed in opposite directions with the central portion detection sensor device 310 interposed therebetween.

In the configuration of related art, cantilevers standing erect are buried in a deformable member. However, such a cantilever system has a drawback that the cantilevers are laid down and a detection failure occurs.

In this regard, according to this exemplary embodiment, the normal force sensor 400 (the central portion detection sensor device 310 and the edge detection sensor devices 321, 322, 323, and 324) is used to detect a force, thereby preventing the failure as in the cantilever system from occurring.

Accordingly, the detection resolution and detection accuracy can be maintained, and high product quality can also be maintained.

Figure 20:
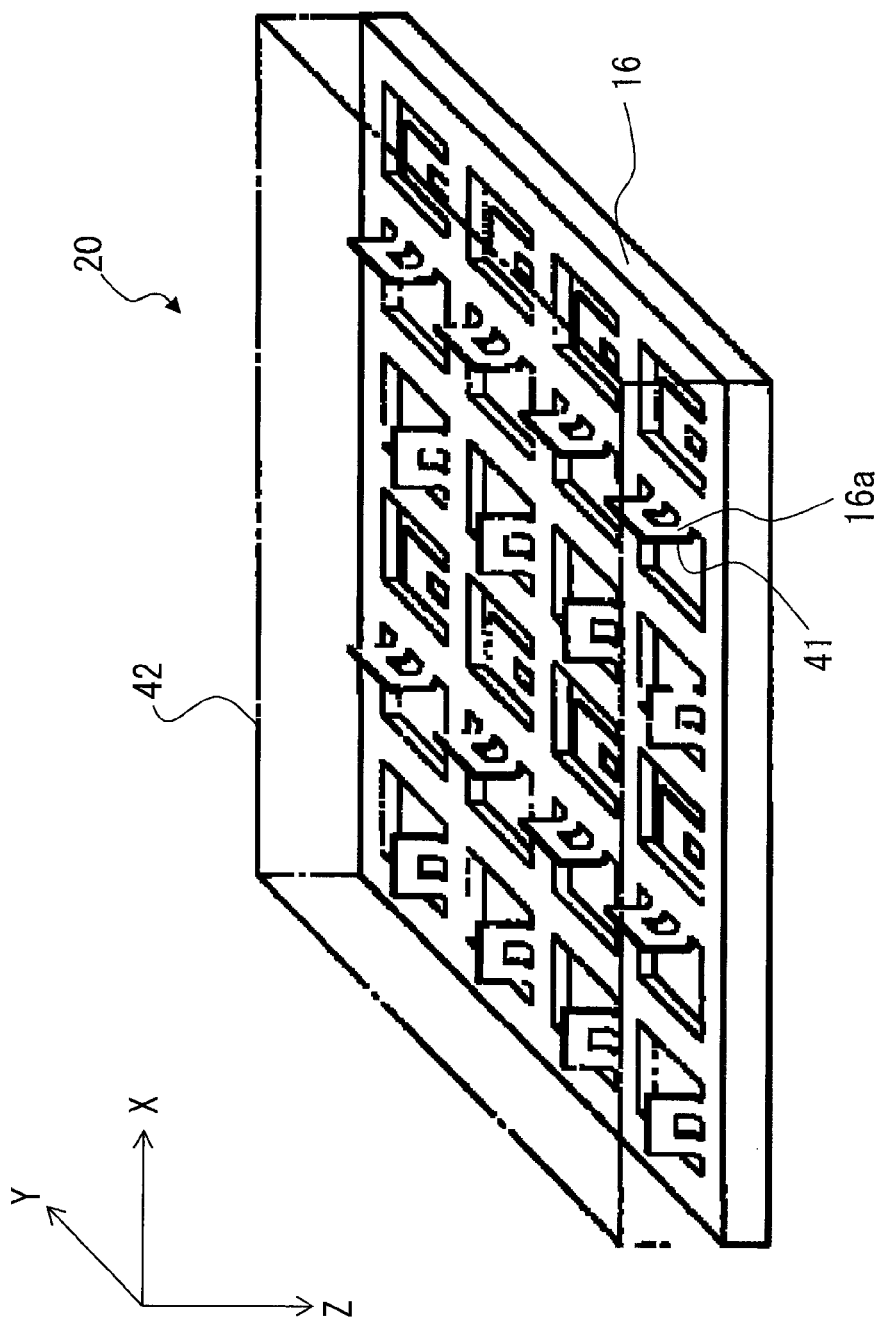
FIG. 20 is a view showing a sensor unit of related art.

(2) In the contact sensor device of related art, unevenness appears on the outer surface as shown in FIG. 20, for example.

Also in this exemplary embodiment, the force detection sheet layer portion 230 having the protrusions 232 formed on the surface thereof can be exposed to the outside without providing the exterior sheet layer portion 210 and the intermediary layer portion 220.

However, if such a structure is mounted on the hand portion 12 or the body surface of the robot 10, the surface thereof becomes uneven.

This is disadvantageous in that in the case of contacting a human, for example, such an uneven or textured surface causes an uncomfortable sense of touch.

In this regard, according to this exemplary embodiment, the outer surface of the exterior sheet layer portion 210 is a smooth surface with no unevenness, which is especially suitable for a humanoid robot required to contact with a human.

(3) The exterior sheet layer portion 210 is provided with the outer protrusions 212 and the force detection sheet layer portion 230 is provided with the force detection protrusions 232, thereby enabling transmission of the shearing force applied to the exterior sheet layer portion 210 to the force detection protrusions 232 through the intermediary layer portion 220.

The raising force and the depressing force, which are generated due to deformation of the force detection protrusions 232, are detected by differential detection using the edge detection sensor devices 321, 322, 323, and 324. This enables highly sensitive detection of the shearing force applied to the exterior sheet layer portion 210.

(4) If the exterior sheet layer portion 210 and the force detection sheet layer portion 230 are arranged such that the protrusions thereof engage with each other without interposing the intermediary layer portion 220 therebetween, there is no room for the force detection protrusions 232 to be deformed, or the amount of deformation of the force detection protrusions 232 is extremely small. This results in being unable to detect the shearing force, or in significant deterioration in detection sensitivity.

In this regard, according to this exemplary embodiment, the flexible intermediary layer portion 220 is interposed between the exterior sheet layer portion 210 and the force detection sheet layer portion 230, which allows the force detection protrusions 232 to be deformed sufficiently.

Consequently, the detection resolution and detection accuracy for detecting the shearing force can be increased.

(5) The sheet layer portion 200 has a simple structure in which three layers are bonded together, which facilitates the manufacturing process.

Figure 10:
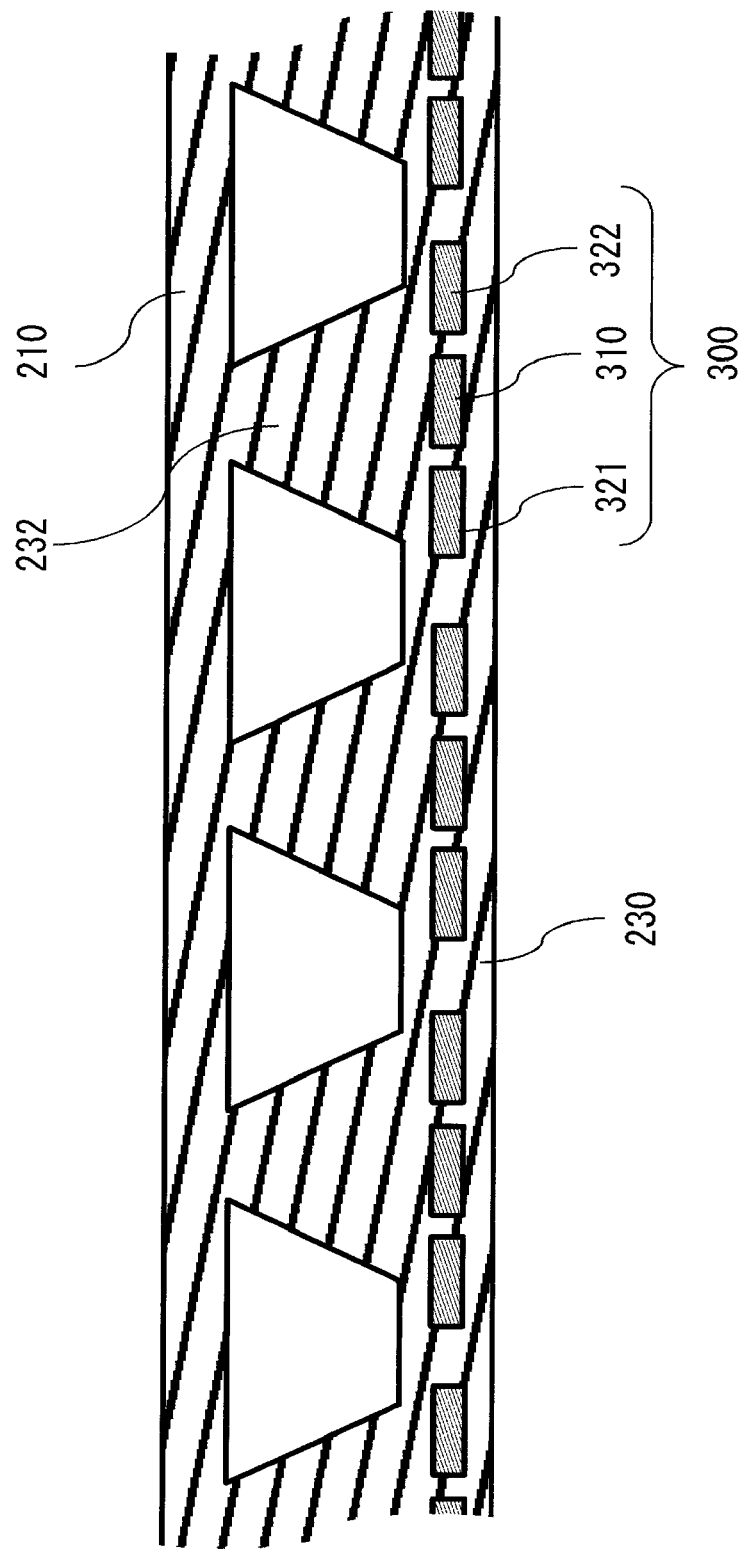
FIG. 10 is a diagram showing a case where an outer surface is continuously formed at tip ends of force detection protrusions, as a comparative example.

For example, as shown in FIG. 10, the outer surface can be continuously formed at the tip ends of the force detection protrusions 232 to thereby form an integrated sheet portion. However, mass production of such a sheet with high accuracy is quite difficult.

(6) Since each of the outer protrusions 212 and the force detection protrusions 232 has a tapered shape, the amount of deformation of the force detection protrusions 232 with respect to the shearing force can be increased, resulting in an increase in the detection resolution and detection accuracy.

(7) The force detection protrusions 232 have a conical shape, thereby obtaining a larger bottom area of the protrusions 232.

For example, if the force detection protrusions are formed in a columnar shape, the sectional area of the columnar shape should be sufficiently reduced so that the force detection protrusions can be deformed with high sensitivity in response to the shearing force. In this case, the distance between the center and the edges of each protrusion is small, which makes it difficult to dispose the central portion detection sensor device 310 and the edge detection sensor devices 321, 322, 323, and 324 at desired positions.

In this regard, according to this exemplary embodiment, the force detection protrusions 232 are formed in a conical shape to thereby obtain a larger bottom area of each protrusion. This provides a sufficient layout space to dispose the central portion detection sensor device 310 at the center and to dispose the edge detection sensor devices 321, 322, 323, and 324 at the edges, thereby solving the problem of difficulty in manufacturing.

Second Embodiment

The first exemplary embodiment illustrates the case where the central portion detection sensor element and the edge detection sensor elements are independent sensor devices.

On the other hand, a second exemplary embodiment is characterized in that one sensor device is disposed so as to correspond to one protrusion, and a plurality of sensing elements are incorporated in the one sensor device.

Figure 11:
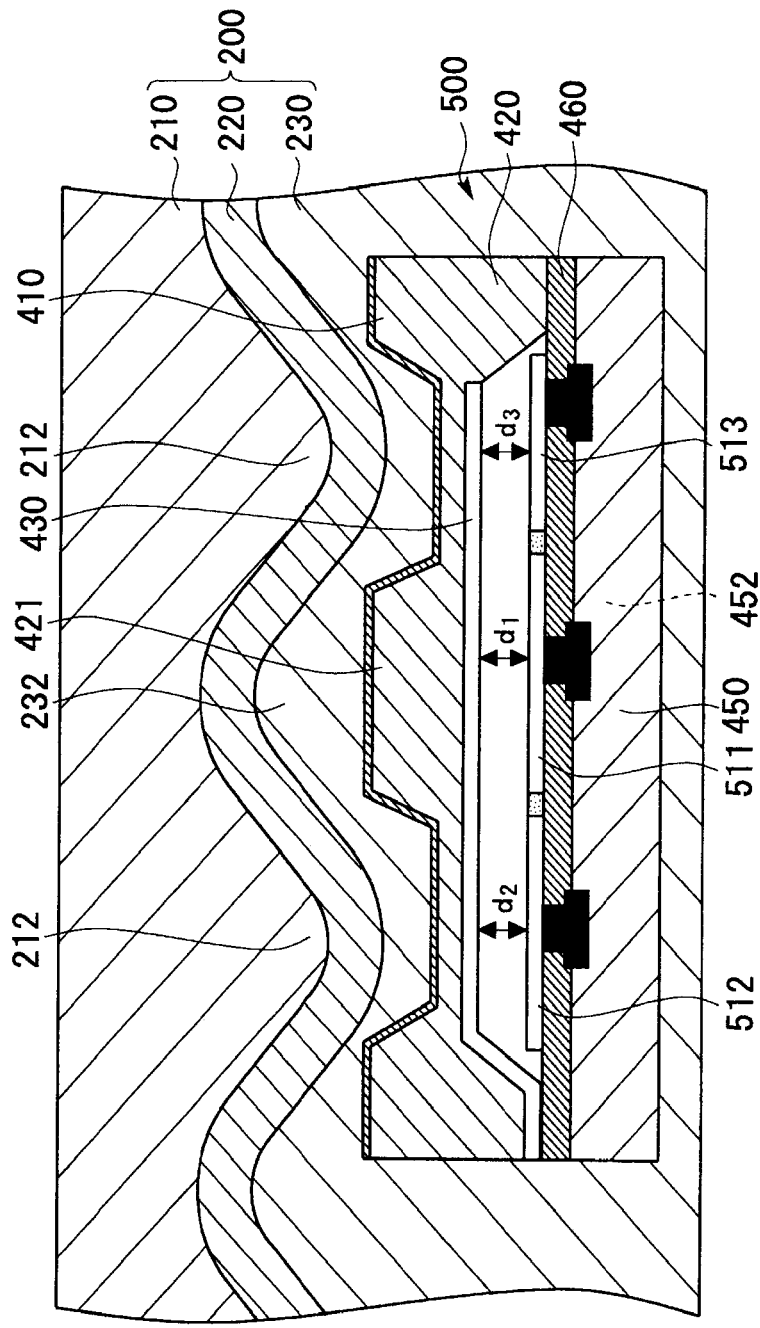
FIG. 11 is a sectional view of a second exemplary embodiment.

FIG. 11 is a sectional view of the second exemplary embodiment.

Figure 12:
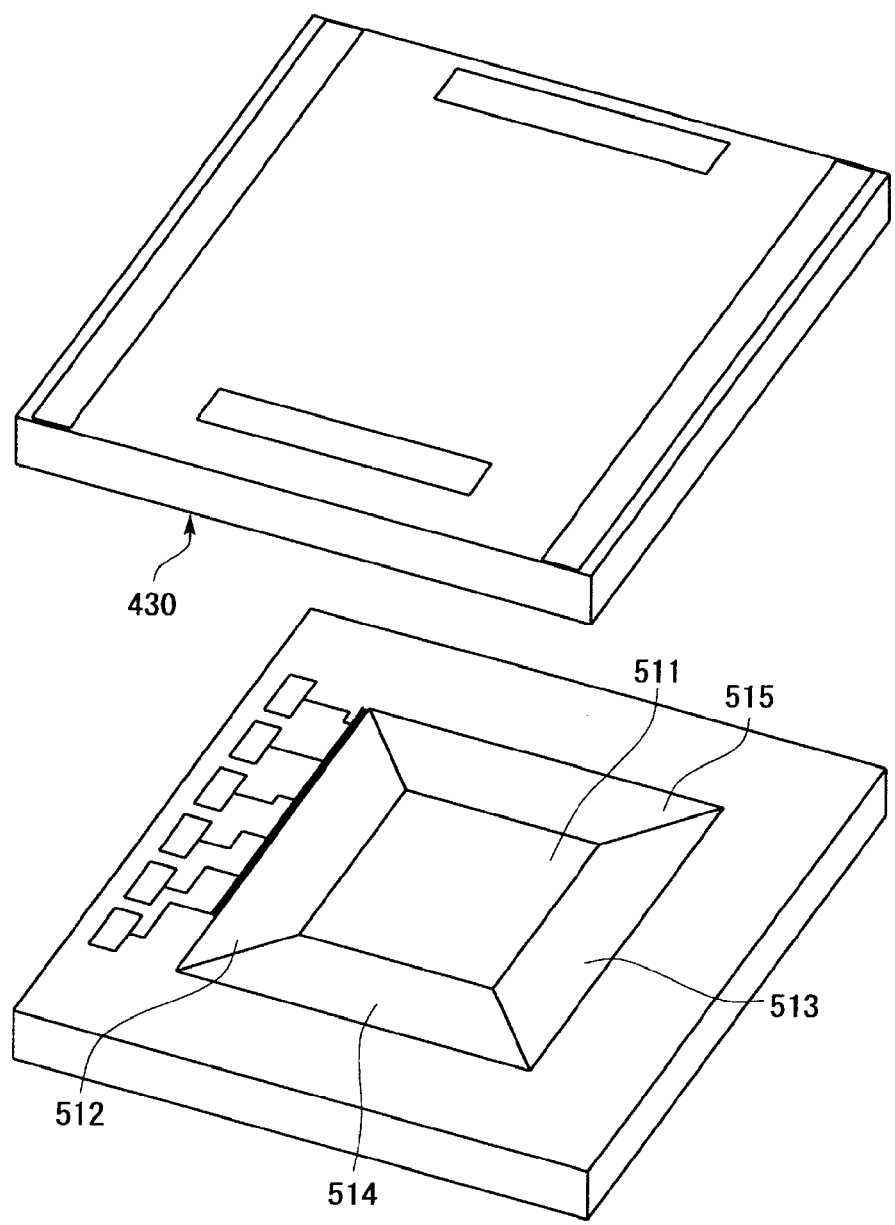
FIG. 12 is a perspective view showing divided electrodes.

FIG. 12 is a perspective view showing divided electrodes.

As shown in the sectional view of FIG. 11, one sensor device 500 is provided so as to correspond to one force detection protrusion 232.

The sensor device 500 includes a plurality of divided electrodes.

In this case, the second sensor electrode is divided.

Specifically, the second sensor electrode is divided into a center electrode 511, which is located at the position immediately below the central portion of the force detection protrusion, and edge electrodes disposed immediately below the edges of the force detection protrusion 232.

As shown in the perspective view of FIG. 12 illustrating the electrode portions, the second sensor electrode is divided into five electrodes.

That is, the five divided electrodes include the center electrode 511, and an electrode (512) in the −Y-direction, an electrode (513) in the +Y-direction, an electrode (514) in the −X-direction, and an electrode (515) in the +X-direction with respect to the center electrode.

In such a configuration, the capacitance of each pair of divided electrodes can be detected.

As shown in the sectional view of FIG. 11, a gap d1 between the first sensor electrode 430 and the center electrode 511, a gap d2 between the first sensor electrode 430 and the −Y-direction electrode 512, and a gap d3 between the first sensor electrode 430 and the +Y-direction electrode 513 can be detected independently.

Here, one sensor device forms a normal stress detection sensor unit, and the central portion detection sensor element and edge detection sensor elements are achieved by division of electrodes.

Also in such a configuration, when a shearing force is applied to the outer surface, the force detection protrusions 232 are deformed in the same manner as described in the first exemplary embodiment.

Then, the first sensor electrode 430 is inclined along with the deformation of the force detection protrusions 232.

The inclination of the first sensor electrode 430 is detected by differential detection between the gap d1 and the gap d3.

This enables detection of the shearing force applied to the outer surface.

Third Embodiment

Though the central portion detection sensor device 310 and the edge detection sensor devices 321 to 324 have the same configuration in the first exemplary embodiment, the central portion detection sensor device 310 and the edge detection sensor devices 321 to 324 may have different sensor sensitivities.

For example, a dielectric having a low dielectric constant is disposed between the electrodes of the central portion detection sensor device 310, and a dielectric having a high dielectric constant is disposed between the electrodes of the edge detection sensor devices 321 to 324.

Figure 13:
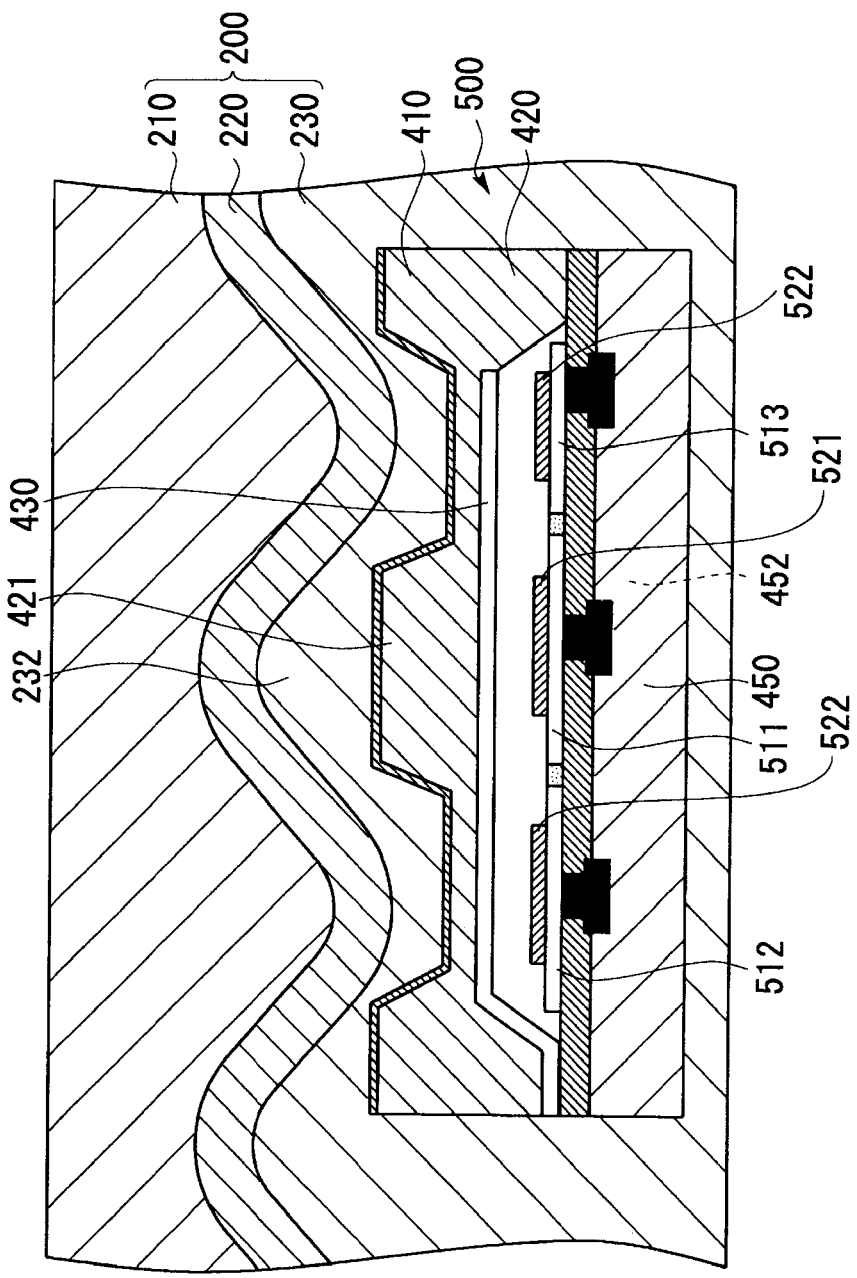
FIG. 13 is a diagram showing a case where a dielectric is provided between electrodes.

In the case where the normal stress detection sensor unit is formed of one sensor device 500, the dielectrics sandwiched between each electrode pair are set to have different dielectric constants as shown in FIG. 13.

In FIG. 13, a low dielectric constant film 521 is formed on the center electrode 511, and a high dielectric constant film 522 is formed on each of the −Y-direction electrode and the +Y-direction electrode.

In the case where a resultant force of a normal stress and a shearing force acts on the outer surface, if the detection resolution for the shearing force is lower than the detection resolution for the normal stress, a problem of failure to appropriately detect the shearing force occurs.

In this regard, the sensitivity of each of the edge detection sensor devices (elements) 321 to 324 is set to be higher than the sensitivity of the central portion detection sensor device (element) 310, thereby enabling appropriate detection of the normal stress and the shearing force even when the resultant force of the normal stress and the shearing force is applied.

Fourth Embodiment

In the first to third exemplary embodiments, the sensor structure portion 410 and the semiconductor substrate 450 are integrated (into one chip).

In this configuration, the integrated circuit 452 incorporated in the semiconductor substrate 450 enables signal processing for sensor signals supplied from the sensor structure portion 410.

Thus, when signal processing can be executed in each of the sensor devices, the signal processing load on an information integration device (not shown) serving as a host can be reduced.

Even when a number of sensor devices are incorporated in the tactile sensor system 100, the processing load on the information integration device can be reduced, thereby enabling high-speed response even in a large system including a number of tactile sensor devices.

An example of the conversion from sensor signals supplied from the sensor structure portion 410 into digital signals will now be described.

The upper surface of the sensor structure portion 410 serves as the force detection portion (sensor surface) 421 that contacts an object.

The sensor structure portion 410 includes the electrode plates 430 and 440 which are disposed to be opposed to each other. When the force detection portion 421 is pushed, a distance d between the two electrode plates 430 and 440 varies.

A change in capacitance due to the variation of the distance d between the electrode plates is provided as an analog sensor signal.

Figure 14:
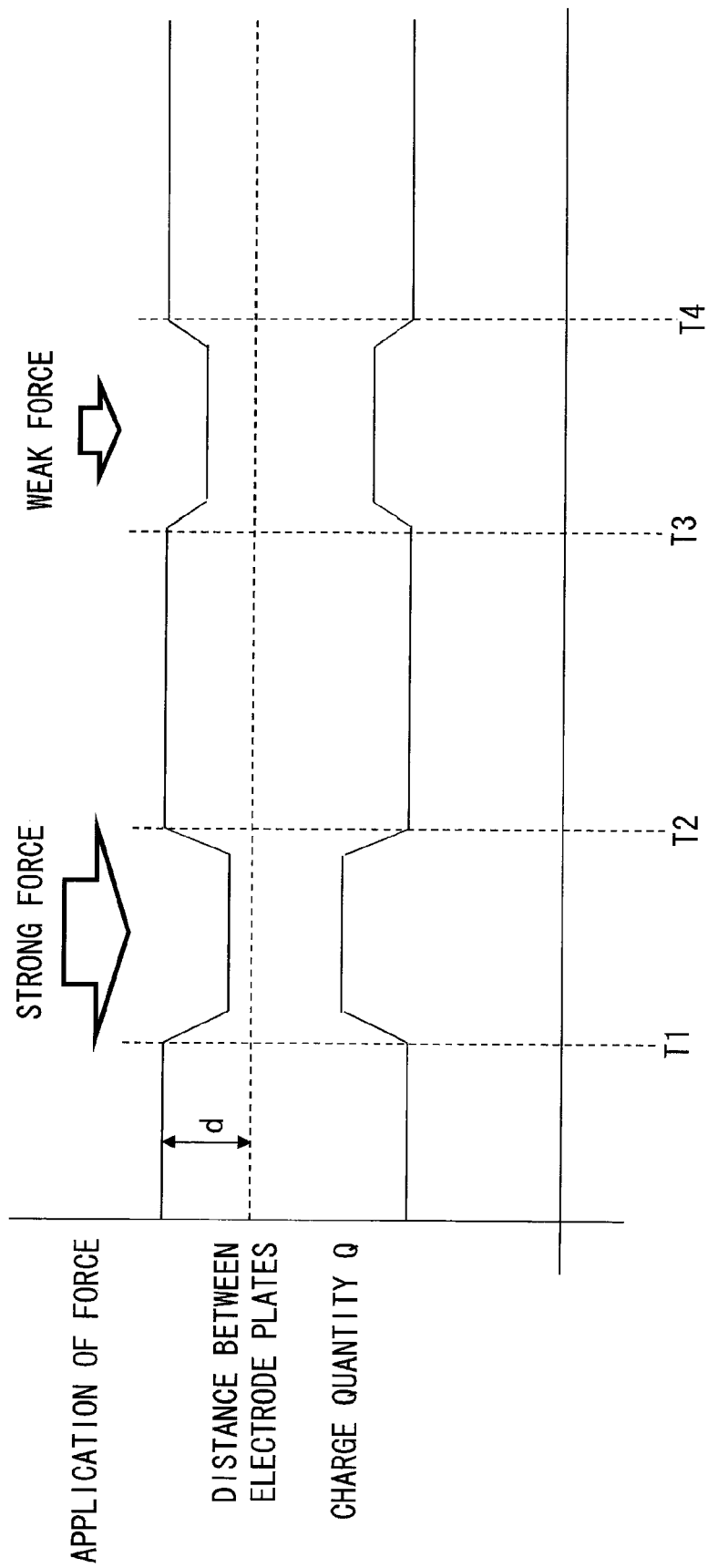
FIG. 14 is a diagram showing a state where a distance d between electrode plates and an electric charge quantity Q between electrode plates vary depending on an applied force.

Assume that, as shown in FIG. 14, for example, a strong force is applied to the force detection portion 421 during a period from time T1 to time T2 and a weak force is applied to the force detection portion 421 during a period from time T3 to time T4.

Then, the distance d between the electrode plates varies depending on the applied force.

An electric charge quantity Q accumulated between electrode plates varies depending on the variation of the distance d between the electrode plates.

The electric charge quantity Q between the electrode plates, which varies depending on the applied force, is sent to the integrated circuit 452 as an analog sensor signal.

Specifically, the electric charge accumulated in the second sensor electrode 440 is detected by the integrated circuit 452 through the redistribution layer 451.

The integrated circuit 452 converts the analog sensor signal supplied from the sensor structure portion 410 into a digital signal.

Figure 15:
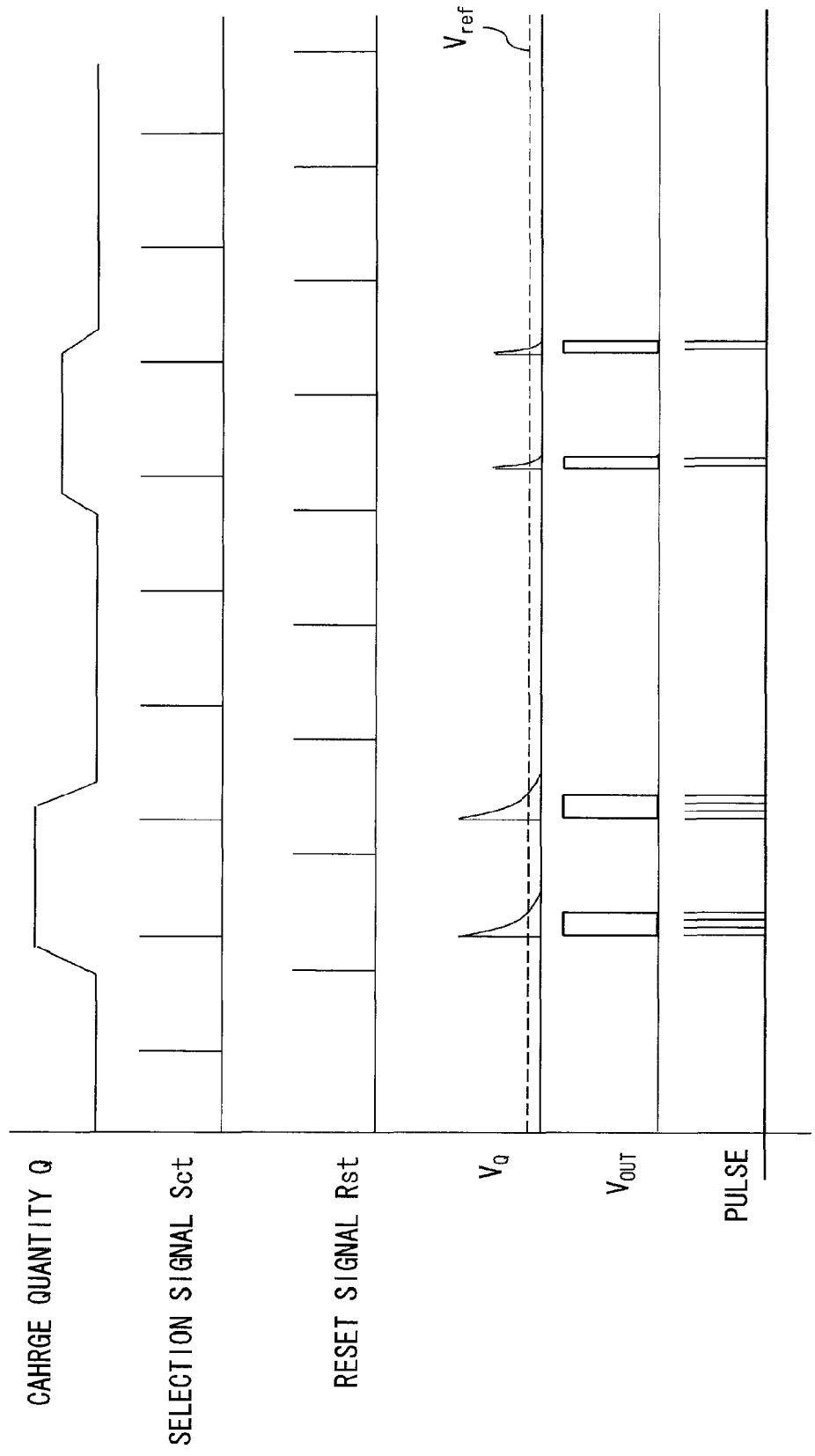
FIG. 15 is a diagram illustrating a procedure of digital conversion from a capacitance change into a frequency change.

The digital conversion from a capacitance change into a frequency change will be described with reference to FIG. 15.

The integrated circuit 452 sends a selection signal Sct and a reset signal Rst at regular intervals upon extraction of the sensor signal from the sensor structure portion 410.

The selection signal Sct is an ON signal of a switch disposed between the electrode plate 440 and the integrated circuit 452.

The reset signal Rst is a signal for temporarily setting the electric charge of the electrode plate 440 to GND to thereby reset the electric charge.

The electric charge quantity Q between the electrode plates is extracted by the selection signal Sct at regular intervals.

The electric charge quantity Q between the electrode plates thus extracted is converted into a voltage VQ through a predetermined resistor.

This voltage VQ is compared with a predetermined reference voltage Vref.

A pulse signal Vout having a duration in which VQ exceeds Vref is generated.

At this time, if the rate of extracting the electric charge is constant, there is a positive correlation between the height of VQ and the pulse width of Vout.

A pulse generator (see FIG. 17) converts Vout into a pulse signal having a predetermined frequency.

Counting of the number of pulses per unit time enables measurement of the force applied to the sensor structure portion 410 in a digital quantity.

Thus, the sensor signal is converted into the digital signal by frequency conversion, thereby generating a digital sensor signal.

The digital sensor signal thus generated is transmitted from each sensor device 400 to the information integration device (not shown).

In the signal transmission, differential serial transmission using signal lines of two buses may be employed.

Thus, when the digital signal is transmitted from the sensor device 400 to the information integration device, the influence of noise can be reduced even if the wiring length between the sensor device 400 and the information integration device is large.

For example, when the sensor device 400 is mounted on the entire body surface of the robot, the entire wiring length is significantly large. For this reason, noise resistance is important.

As compared to the case of directly transmitting an analog signal, the configuration of this exemplary embodiment is suitable for a sensor system including a number of sensor devices 400.

Modified Example 1

Figure 16:
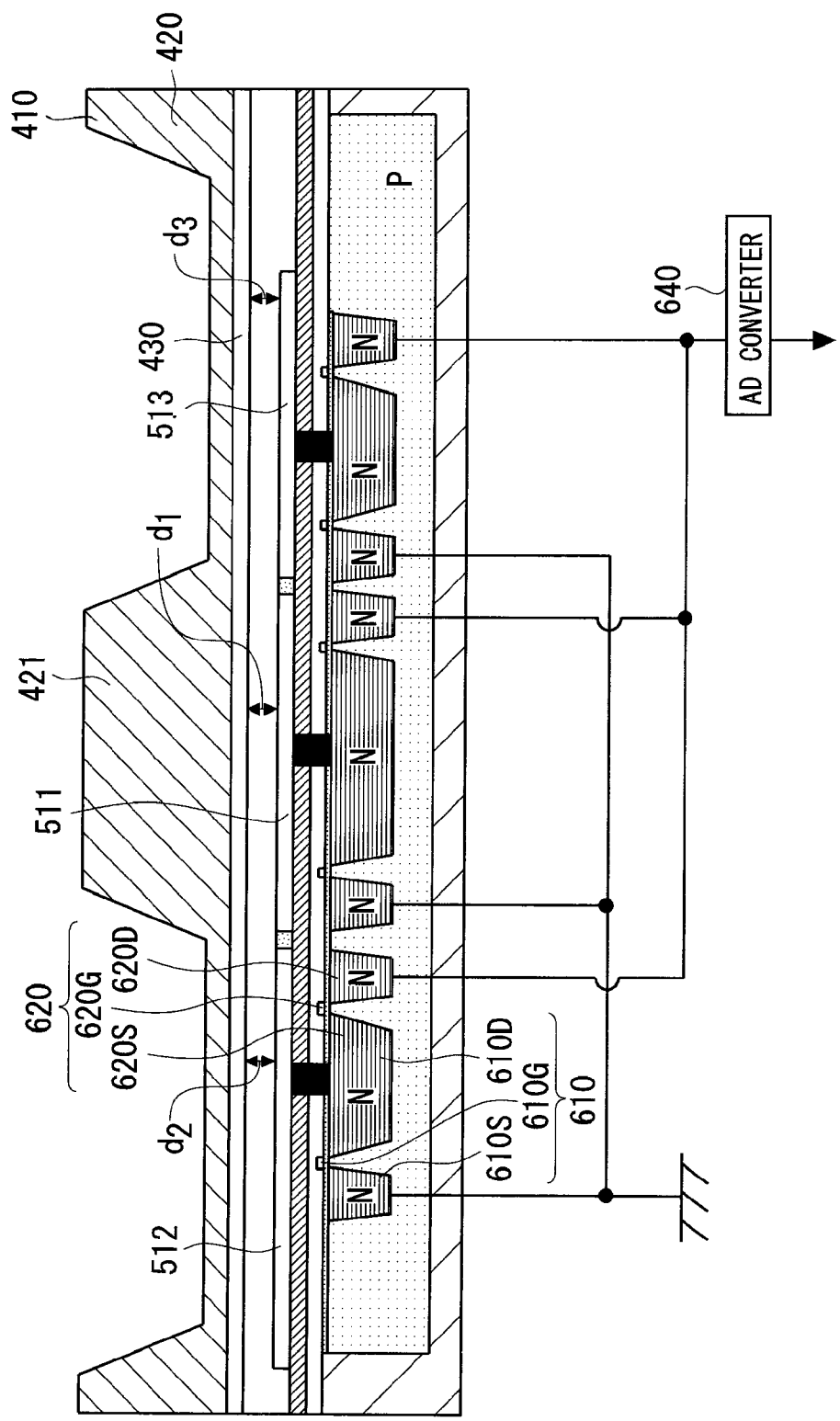
FIG. 16 is a diagram illustrating a configuration for detecting sensing elements independently.
Figure 17:
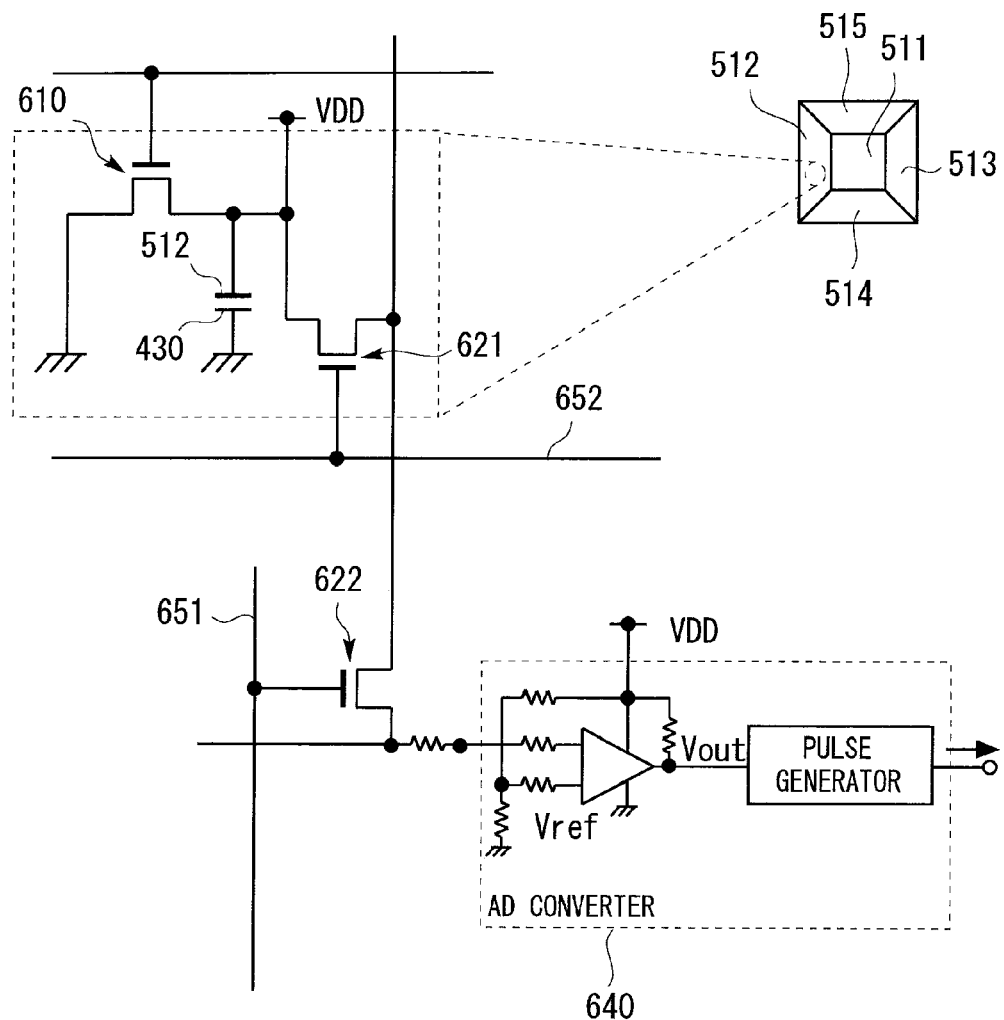
FIG. 17 is a diagram illustrating a configuration for detecting sensing elements independently.
Figure 18:
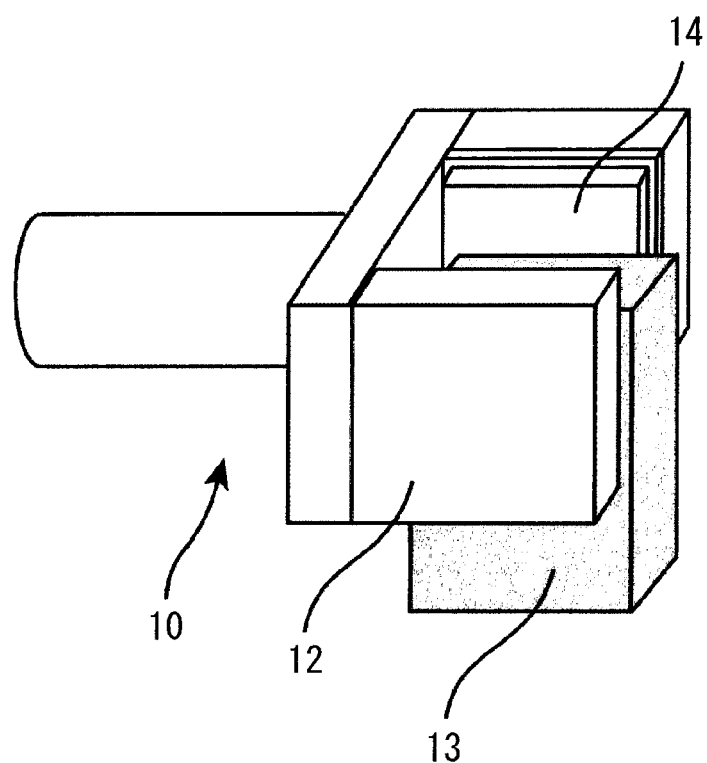
FIG. 18 is a view showing a state where a robot lifts an object with a hand portion.
Figure 19:
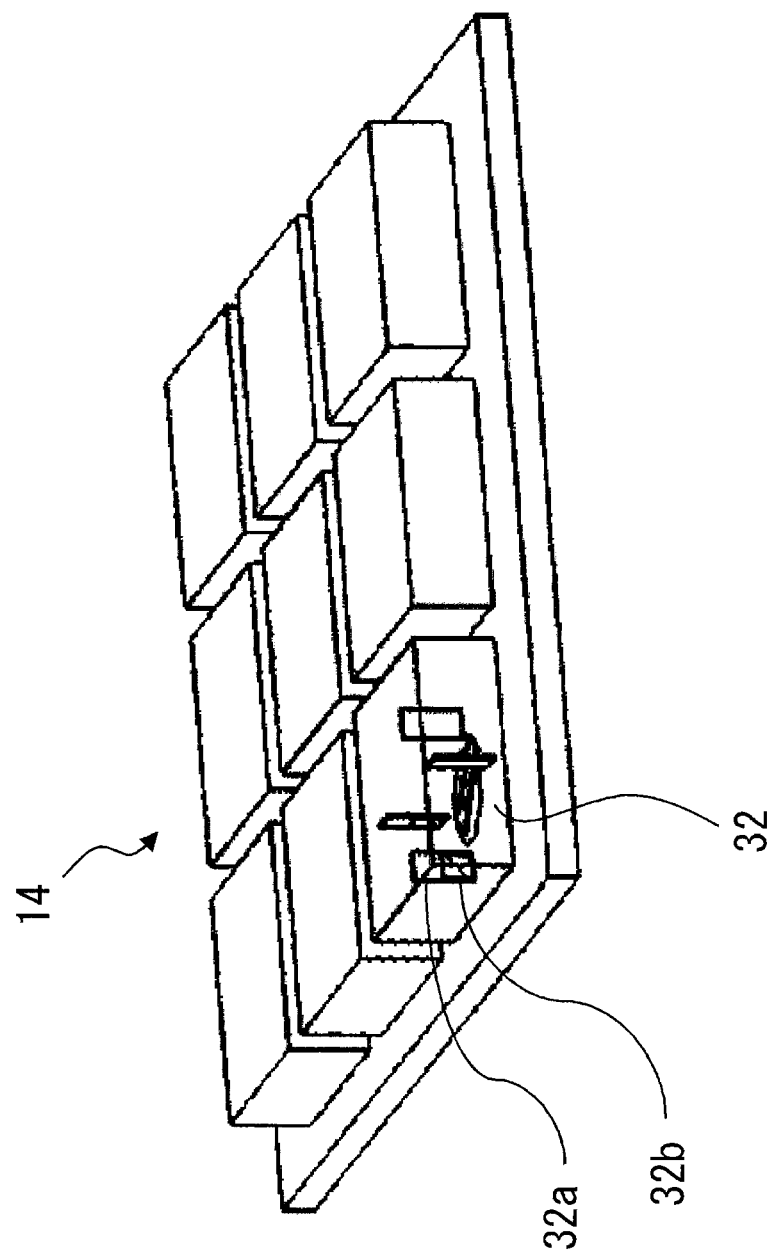
FIG. 19 is a view showing a sensor unit of related art.

When a plurality of sensing elements are incorporated in a single sensor device, sensor signals of sensing elements are extracted by configurations shown in FIGS. 16 and 17, for example.

In FIG. 16, the gap d1 between the first sensor electrode 430 and the center electrode 511, the gap d2 between the first sensor electrode 430 and the −Y-direction electrode 512, and the gap d3 between the first sensor electrode 430 and the +Y-direction electrode 513 can be detected independently.

Each of the electrodes 511, 512, and 513 is provided with a reset switch 610 and a selection switch 620.

Each source/drain region of the reset switch 610 and the selection switch 620 is an N-well formed in a P-well.

As shown in FIG. 16, a drain 610D of the reset switch 610 and a source 610S of the selection switch 620 are connected in common.

The source 610S of the reset switch 610 is connected to GND.

The drain 610D of the selection switch 620 is connected to an AD converter 640.

Note that in FIG. 16, the gate of the reset switch 610 is denoted by 610G, and the gate of the selection switch is denoted by 610G.

Since the sensor electrode is divided into five electrodes, the electrodes 511, 512, 513, 514, and 515 from which signals are to be extracted are selected by turning on any of the selection switches 620.

In the case of providing selection switches, selection lines 651 in the X-direction and selection lines 652 in the Y-direction may be provided in a grid shape as shown in FIG. 17. Each of a row selection switch 621 and a column selection switch 622 may be selected to thereby select a desired electrode from among the electrodes 511 to 515.

Note that the present invention is not limited to the above exemplary embodiments, but can be modified as needed without departing from the scope of the invention.

While the above exemplary embodiments illustrate the case where a normal stress is detected based on a change in the distance between two electrode plates, the configuration of the sensor device (sensing element) is not particularly limited as long as the normal stress can be detected.

The sensor device preferably has the following configuration. That is, a sensor structure portion is integrated on a substrate as MEMS (Micro Electro Mechanical Systems), and an integrated circuit is also integrated on a semiconductor substrate. Further, the MEMS of the sensor structure portion and the semiconductor substrate of the integrated circuit are joined together to thereby form an integrated sensor element chip.

However, the sensor devices may not be necessarily integrated. The sensor structure portion and the signal processing portion may be separated from each other and arranged in proximity to each other.

The above exemplary embodiments illustrate the case where the normal stress detection sensor unit is buried in the force detection sheet layer portion. Alternatively, the normal stress detection sensor unit may be disposed immediately below the force detection sheet layer portion, as long as the normal stress detection sensor unit can detect a deformation of the force detection protrusion.

REFERENCE SIGNS LIST

10 . . . ROBOT, 12 . . . HAND PORTION, 13 . . . OBJECT, 14 . . . TACTILE SENSOR UNIT, 16 . . . BASE, 20 . . . TACTILE SENSOR DEVICE, 31 . . . DEFORMABLE MEMBER, 32 . . . STRAIN SENSOR, 32a . . . FLAT PLATE (CANTILEVER), 32b . . . STRAIN GAUGE, 41 . . . CANTILEVER, 42 . . . ELASTIC BODY, 100 . . . SHEET-LIKE TACTILE SENSOR SYSTEM, 200 . . . SHEET LAYER PORTION, 210 . . . EXTERIOR SHEET LAYER PORTION, 212 . . . OUTER PROTRUSION, 220 . . . INTERMEDIARY LAYER PORTION, 230 . . . FORCE DETECTION SHEET LAYER PORTION, 232 . . . FORCE DETECTION PROTRUSION, 300 . . . NORMAL STRESS DETECTION SENSOR UNIT, 310 . . . CENTRAL PORTION DETECTION SENSOR DEVICE, 321, 322, 323, 324 . . . EDGE PORTION DETECTION SENSOR DEVICE, 400 . . . DETECTION SENSOR DEVICE, 410 . . . SENSOR STRUCTURE PORTION, 420 . . . STRUCTURE MAIN BODY PORTION, 421 . . . FORCE DETECTION PORTION, 422 . . . THIN PORTION, 423 . . . SUPPORT FRAME PORTION, 424 . . . RECESS, 430 . . . SENSOR ELECTRODE, 440 . . . SENSOR ELECTRODE, 450 . . . SEMICONDUCTOR SUBSTRATE, 451 . . . REWIRING LAYER, 452 . . . INTEGRATED CIRCUIT, 453 . . . EXTERNAL TERMINAL, 460 . . . ADHESIVE LAYER, 461 . . . VIA HOLE, 500 . . . SENSOR DEVICE, 511 . . . CENTER ELECTRODE, 511, 512, 513, 514, 515 . . . ELECTRODE, 521 . . . LOW DIELECTRIC CONSTANT FILM, 522 . . . HIGH DIELECTRIC CONSTANT FILM, 610 . . . RESET SWITCH, 610D . . . DRAIN, 610S . . . SOURCE, 610G . . . GATE, 620 . . . SELECTION SWITCH, 620D . . . DRAIN, 620S . . . SOURCE, 620G . . . GATE, 621 . . . ROW SELECTION SWITCH, 622 . . . COLUMN SELECTION SWITCH, 640 . . . AD CONVERTER, 651 . . . X-DIRECTION SELECTION LINE, 652 . . . Y-DIRECTION SELECTION LINE.

The invention claimed is:

1. A sheet-like tactile sensor system that detects a normal stress and a shearing force when the sheet-like tactile sensor system contacts an object, the sheet-like tactile sensor system comprising:

a plurality of normal stress detection sensor units capable of detecting a normal stress;

a sheet layer portion formed of three sheet layers laminated, the sheet layer portion being configured to be deformed by a contact with the object and to transmit the contact force to the normal stress detection unit, wherein the sheet layer portion includes:

an exterior sheet layer portion forming an outer surface;

a force detection sheet layer portion incorporating the normal stress detection unit or being disposed immediately above the normal stress detection unit; and an intermediary layer sandwiched between the exterior sheet layer portion and the force detection sheet layer portion and transmitting an acting force from the exterior sheet layer portion to the force detection sheet layer portion, wherein the exterior sheet layer portion and the force detection sheet layer portion have a plurality of protrusions protruding in directions opposed to each other, and are disposed such that the protrusions of the exterior sheet layer portion and the protrusions of the force detection sheet layer portion engage each other with the intermediary layer interposed therebetween, and wherein each of the normal stress detection sensor units includes:
- a central portion detection sensor element disposed immediately below a central portion of each of the protrusions provided on the force detection sheet portion; and
- at least two edge detection sensor elements disposed immediately below edge portions of each of the protrusions provided on the force detection sheet portion so as to sandwich the central portion detection sensor element.

2. The sheet-like tactile sensor system according to claim 1, wherein when an X-axis and a Y-axis are set to be orthogonal to each other on a plane in parallel with a surface of the sheet layer portion, the edge detection sensor elements are arranged in each of a Y-axis direction and an X-axis direction.

3. The sheet-like tactile sensor system according to claim 1, wherein the intermediary layer is an elastic body having an elastic modulus smaller than that of the exterior sheet layer portion and the force detection sheet layer portion, or a viscous body having viscosity.

4. The sheet-like tactile sensor system according to claim 1, wherein each of the protrusions has a tapered shape.

5. The sheet-like tactile sensor system according to claim 4, wherein the protrusion has a conical shape.

6. The sheet-like tactile sensor system according to claim 1, wherein the central portion detection sensor element and the edge detection sensor elements have different detection sensitivities.

7. The sheet-like tactile sensor system according to claim 6, wherein the edge detection sensor elements have a detection sensitivity higher than that of the central portion detection sensor element.

8. The sheet-like tactile sensor system according to claim 1, wherein the central portion detection sensor element and the edge detection sensor elements are capacitance-type pressure sensors.

9. The sheet-like tactile sensor system according to claim 8, wherein a dielectric constant of a dielectric disposed between two electrodes forming the central portion detection sensor element is different from a dielectric constant of a dielectric disposed between two electrodes forming the edge detection sensor elements.

10. The sheet-like tactile sensor system according to claim 9, wherein a dielectric constant of a dielectric disposed between two electrodes forming the central portion detection sensor element is smaller than a dielectric constant of a dielectric disposed between two electrodes forming the edge detection sensor elements.

11. The sheet-like tactile sensor system according to claim 1, wherein the central portion detection sensor element and the edge detection sensor elements are separate from each other.

12. The sheet-like tactile sensor system according to claim 1, wherein the central portion detection sensor element and the edge detection sensor elements are incorporated in a single sensor device.

13. A sensor system comprising:
- a sheet layer;
- a first sensor capable of detecting a force acting perpendicularly to a surface of the sheet layer at a first position of the sheet layer; and
- a second sensor capable of detecting a force acting perpendicularly to the surface of the sheet layer at a second position of the sheet layer,
- wherein one of a direction and a magnitude of a force acting on the surface of the sheet layer can be detected based on a detected value of the first sensor and a detected value of the second sensor,
- wherein the first position is different from the second position,
- wherein the surface of the sheet layer is a smooth surface with no unevenness, and
- wherein the force acts in parallel with the surface of the sheet layer.

14. The sensor system according to claim 13, wherein when the detected value of the first sensor is greater than the detected value of the second sensor, the direction of the force acting in parallel with the surface of the sheet layer is detected as a direction from the second position to the first position.

15. The sensor system according to claim 13, further comprising a third sensor capable of detecting a force acting perpendicularly to the surface of the sheet layer at a third position of the sheet layer,
- wherein a straight line passing through the first position and the second position intersects a straight line passing through the first position and the third position, and
- wherein one of a direction and a magnitude of a force acting on the sheet layer and acting in parallel with the surface of the sheet layer can be detected based on a detected value of the first sensor, a detected value of the second sensor, and a detected value of the third sensor.

* * * * *

UNITED STATES PATENT AND TRADEMARK OFFICE
CERTIFICATE OF CORRECTION

PATENT NO. : 8,613,231 B2  Page 1 of 1
APPLICATION NO. : 13/502082
DATED : December 24, 2013
INVENTOR(S) : Muroyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 36 days.

Signed and Sealed this
Twenty-second Day of September, 2015

Michelle K. Lee
*Director of the United States Patent and Trademark Office*